United States Patent [19]

Tajima

[11] Patent Number: 4,797,937
[45] Date of Patent: Jan. 10, 1989

[54] APPARATUS FOR IDENTIFYING POSTAGE STAMPS

[75] Inventor: Joji Tajima, Tokyo, Japan

[73] Assignee: NEC Corporation, Japan

[21] Appl. No.: 59,934

[22] Filed: Jun. 9, 1987

[51] Int. Cl.$^4$ ............................................. G06K 9/00
[52] U.S. Cl. ......................................... 382/1; 209/584; 250/226
[58] Field of Search ................. 382/1, 17; 209/584, 209/900; 250/226

[56] References Cited

U.S. PATENT DOCUMENTS

| | | | |
|---|---|---|---|
| 3,488,511 | 1/1970 | Mori et al. | 250/226 |
| 3,745,527 | 7/1973 | Yoshimura et al. | 382/1 |
| 4,075,604 | 2/1978 | Degasperi | 250/226 |
| 4,191,940 | 3/1980 | Polcyn et al. | 382/17 |
| 4,194,839 | 3/1980 | Knop | 250/226 |
| 4,204,765 | 5/1980 | Iannadrea et al. | 250/556 |

Primary Examiner—Leo H. Boudreau
Assistant Examiner—Donald J. Daley
Attorney, Agent, or Firm—Ostrolenk, Faber, Gerb & Soffen

[57] ABSTRACT

An apparatus for identifying postage stamps automatically includes one or more scanners for detecting the various colors which are present at predetermined regions on the stamp proper and associated circuitry which receives the color signals and derives from them a feature vector which represents the color distribution over the scanned area. A plurality of feature vectors which define the color distribution associated with known stamps is stored in a memory. A comparator compares the feature vector of the stamp being examined to the prestored feature vectors and determines the identity of the stamps.

18 Claims, 14 Drawing Sheets

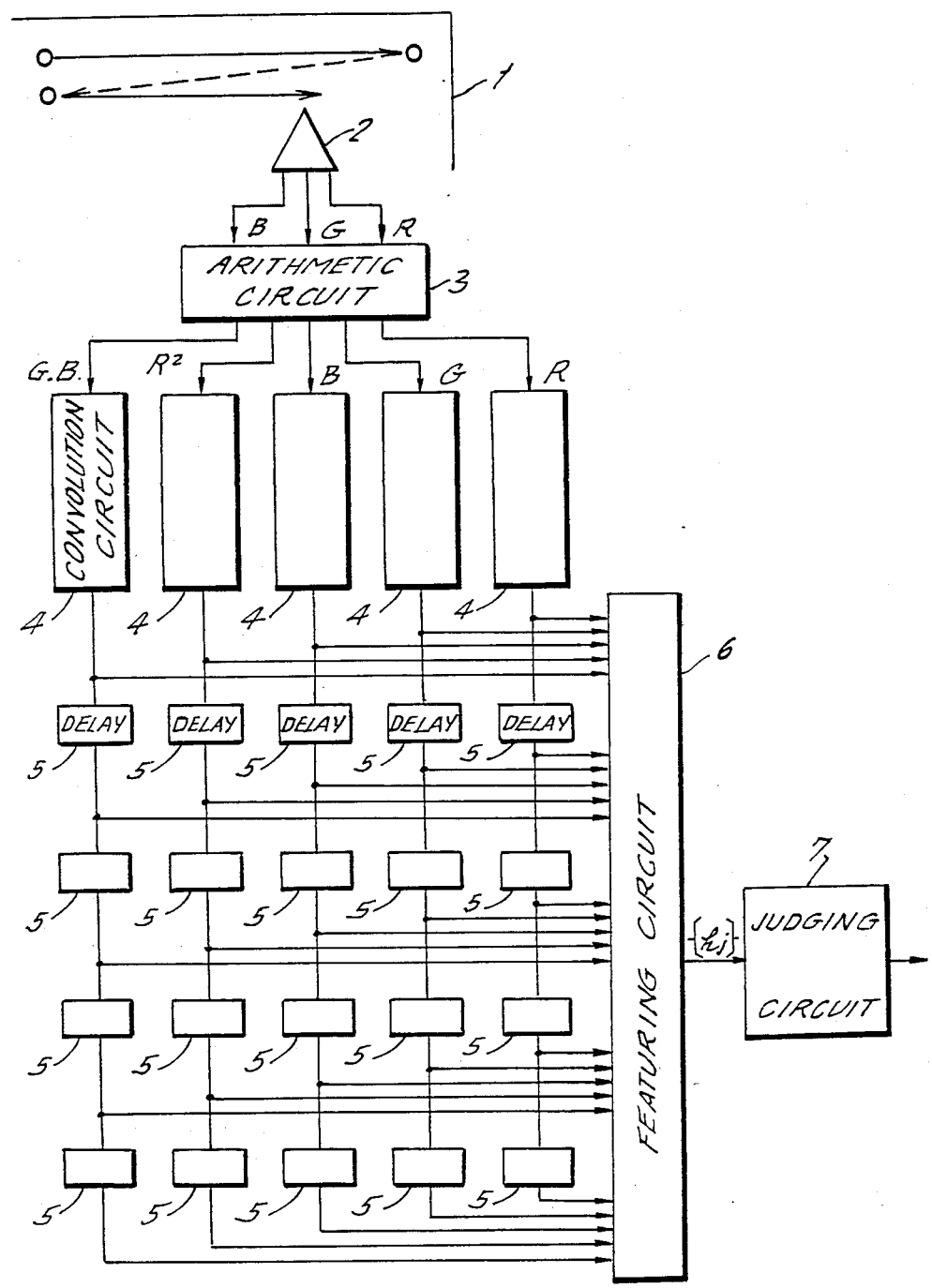

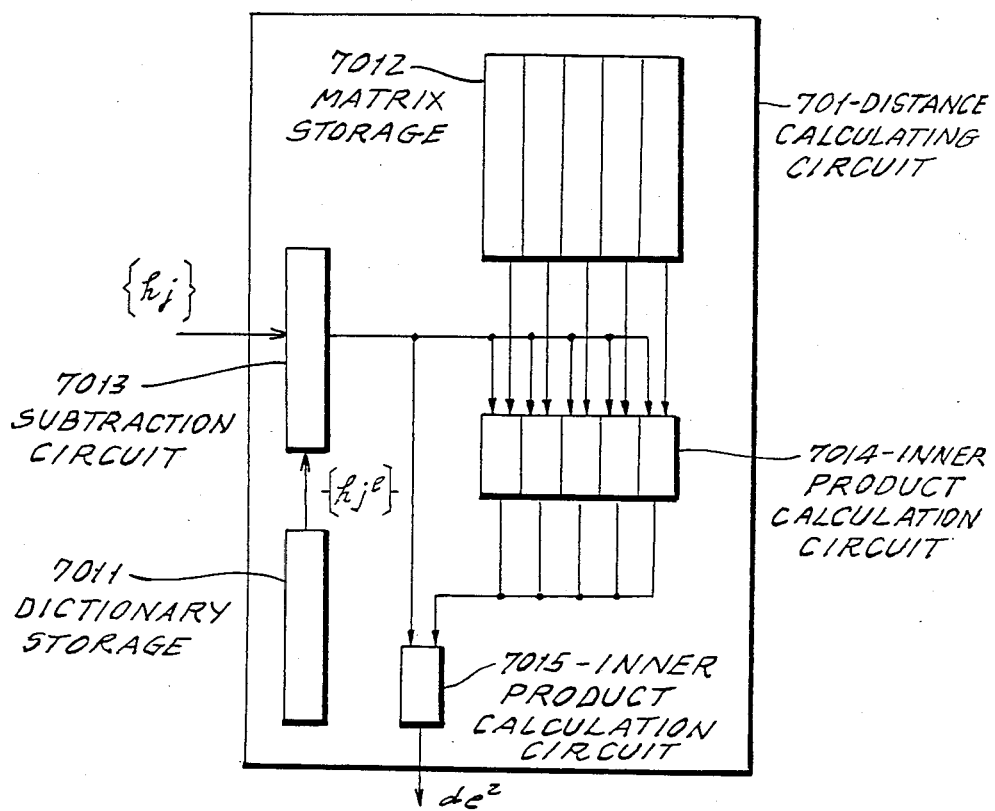
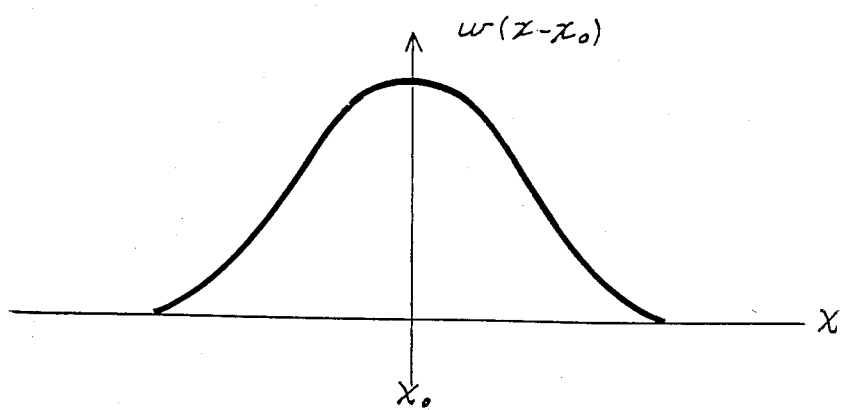

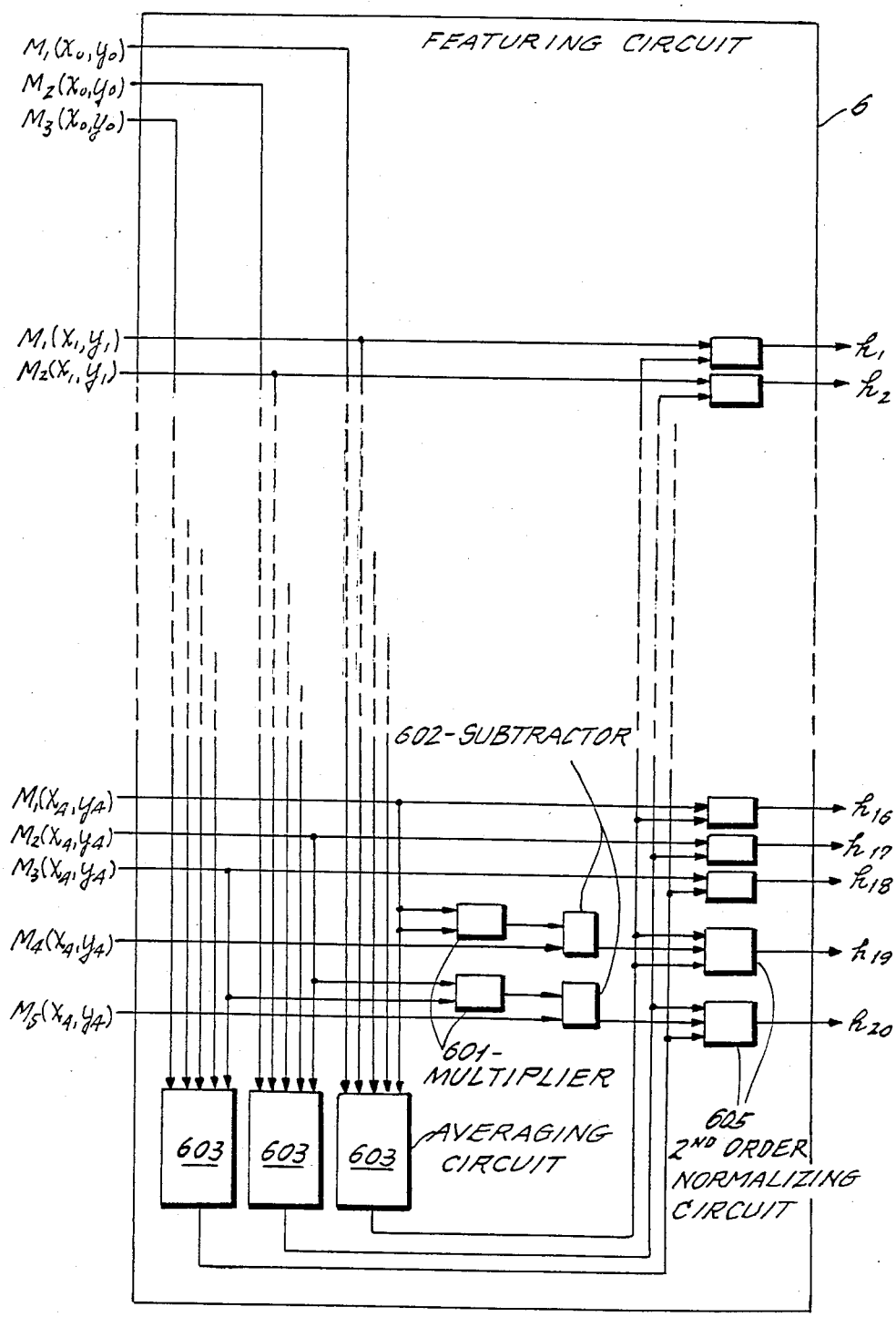

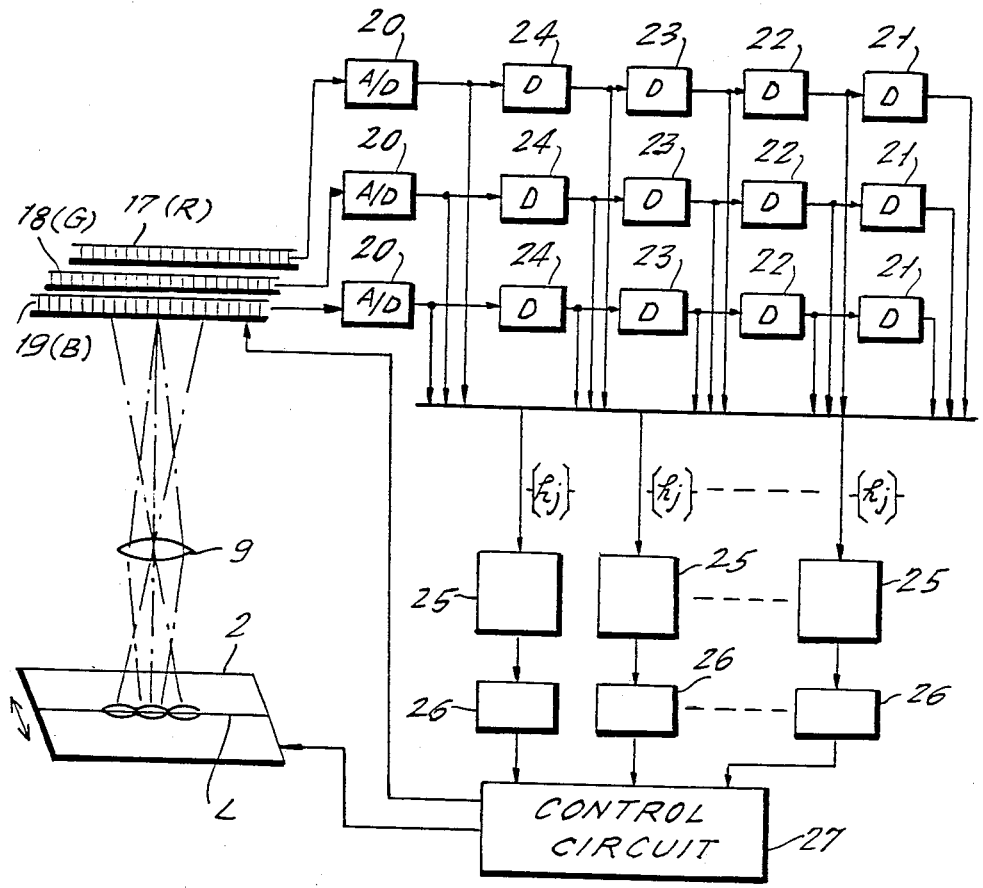

4,797,937

APPARATUS FOR IDENTIFYING POSTAGE STAMPS

BACKGROUND OF THE INVENTION

1. Field of the Invention

The present invention relates to a mail processing apparatus, and more particularly, to an apparatus for itentifying postage stamps based on identifying the color information contained in the stamps.

2. Prior Art

An automatic mail processing apparatus has been developed in which a postage stamp affixed on a mail article is detected and the type of the detected stamp is identified so as to determine the type of the mail article (ordinary mail or express mail) and whether or not the appropriate postage is affixed. According to the prior art, postage stamps are generally detected according to one method based on the luminescence of luminescent stamps, such as fluorescent or phosphorescent stamps. Another method relies on a special mark printed on each stamp, and yet a further method relies on detecting the predetermined color of each type of stamp. However, the first method has a disadvantage in that the cost of producing the stamps is increased, and the other methods suffer from a problem in that the design of the postage stamps is limited.

In Japan, each regular postage stamp has a frame of a specific color associated with its postage, and this specific color frame is detected to determine the type of the postage stamp. This method also restricts the design of the stamps. All stamps including commemorative stamps must have a specific color frame. Stamps having no specific color frame cannot be detected in the prior art processing apparatus.

SUMMARY OF THE INVENTION

Accordingly, it is an object of the present invention to provide an apparatus for identifying postage stamps which does not impose any limitation on the design of the stamps.

According to the present invention, there is provided a postage stamp identifying apparatus, in which color characteristic patterns of the stamp are extracted as a feature vector from a stamp, and the detected color characteristic pattern of the stamp is compared with each of standard color characteristic patterns prepared beforehand for known stamps.

BRIEF DESCRIPTION OF THE DRAWINGS

FIG. 3 illustrates a block diagram of a first embodiment of the present invention.

FIG. 10 illustrates a distance calculating circuit in FIG. 9 in which Mahalanobis' distance is used.

FIG. 11 illustrates a featuring circuit in a second embodiment of the present invention.

FIG. 12 illustrates distribution of weights employed in a third embodiment of the present invention.

FIG. 19 illustrates a diagram of a seventh embodiment of the present invention in which line sensor arrays are employed as a sensor.

DESCRIPTION OF THE PREFERRED EMBODIMENTS

Figure 1:
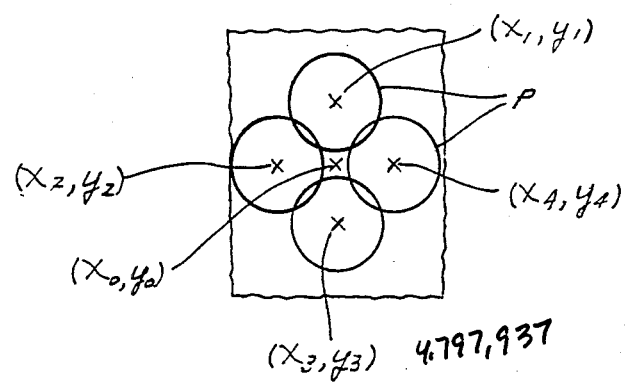
FIG. 1 shows predefined portions on a stamp to be used for color characteristic pattern extraction performed in accordance with the present invention.
Figure 2A:
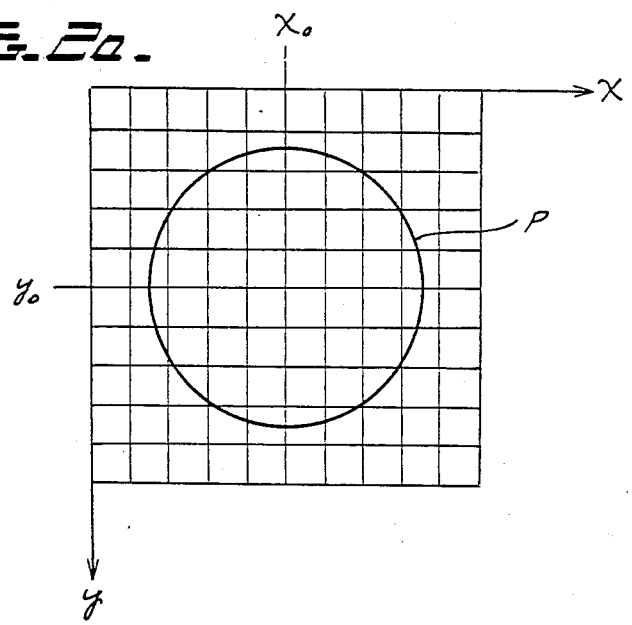
FIG. 2(a) is an enlarged view of one portion of FIG. 1.
Figure 2B:
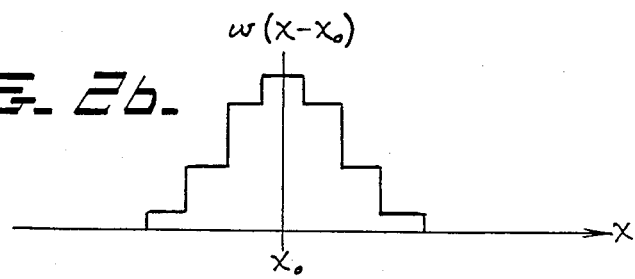
FIG. 2(b) shows distribution of weights in the portion of FIG. 2(a).

The function of the present invention will be described below by referring to FIGS. 1, 2(a) and 2(b). In the present invention, the image of a postage stamp is divided into several image portions p, as shown in FIG. 1, and the color distribution in each image portion is described by color moment in the color space so as to identify the stamp pattern.

The method of calculating the color moment in each image portion will now be described by referring to FIGS. 2(a) and 2(b). An image at a position (x, y) is detected by a sensor having n spectral sensitivities, and the sensor generates signals $f_1(x, y), f_2(x, y), \ldots, f_i(x, y), \ldots, f_n(x, y)$ ($i=1, \ldots, n$). Generally, a color sensor has sensitivities of red light (R), green light (G), and blue light (B), and the outputs of the sensor, $f_1$, $f_2$, and $f_3$, are therefore signals representing a red image R(x, y), a green image G(x, y), and a blue image B(x, y). At this point, the color moment $M_k(x_0, y_0)$ ($k=1, \ldots, m$) of the image portion p whose center is at $(x_0, y_0)$ is defined by the following Expression (1):

$$M_k(x_0,y_0) = \sum_{(x,y)\in S_0} \omega(x - x_0, y - y_0) \cdot R(x,y)^{\rho_k} \cdot G(x,y)^{\gamma_k} \cdot B(x,y)^{\beta_k} \tag{1}$$

$(\rho_k, \gamma_k, \beta_k = 0, 1, 2, \ldots)$ where $S_0$ is a region occupied by the image portion p, and $\omega(x-x_0, y-y_0)$ is a weight in case the center is at ($x_0$, $y_0$). The weight is generally higher near the center and lower near the periphery, as shown in FIG. 2(b).

As can be seen from the above definition, if $$\sum_{(x,y) \in S_0} \omega(x - x_0, y - y_0) = 1$$

and $\rho_1 = 1$, $\gamma_1 = \beta_1 = 0$; $M_1(x_0, y_0)$ represents a weighted average of the red image centered at ($x_0$, $y_0$). Similarly, if $\rho_2 = 0$, $\gamma_2 = 1$, $\beta_2 = 0$, and $\rho_3 = \gamma_3 = 0$, $\beta_3 = 1$; $M_2(x_0, y_0)$ and $M_3(x_0, y_0)$ represent weighted averages of the green image and blue image, respectively.

If $\rho_4 = 2$, $\gamma_4 = \beta_4 = 0$, and $\rho_5 = 0$, $\gamma_5 = \beta_5 = 1$;

$$M_4(x_0, y_0) \equiv \sum_{(x,y) \in S_0} \omega(x - x_0, y - y_0) R(x,y)^2$$

$$M_5(x_0, y_0) \equiv \sum_{(x,y) \in S_0} \omega(x - x_0, y - y_0) G(x,y) B(x,y)$$

In order to make the color moments $M_4$ and $M_5$ uncorrelated to the color moments $M_1$, $M_2$, the color moments $M_3$, $M_4$ and $M_5$ are made to be the variance of the red image and the covariances of the green and blue images, respectively, and are set by:

$$M_4'(x_0, y_0) \equiv M_4(x_0, y_0) - M_1^2(x_0, y_0)$$

$$M_5'(x_0, y_0) \equiv M_5(x_0, y_0) - M_2(x_0, y_0) M_3(x_0, y_0) \quad (2)$$

In consequence, the color distribution for the image portion centered on (x, y) is expressed by the following features:

$$\{g_j\}(j = 1, \ldots, 5)$$

where $g_1(x, y) = M_1(x, y)$, $g_2(x, y) = M_2(x, y)$, $g_3(x, y) = M_3(x, y)$, $g_4(x, y) = M_4'(x, y)$, and $g_5(x, y) = M_5'(x, y)$.

If the image is divided into five image portions p, as shown in FIG. 1, and the entire image is expressed as a set of color distributions of these image portions, the color distribution of the entire image can be expressed in the same way by a feature vector:

$$\{h_j\}(j = 1, \ldots, 25),$$

$$\text{where } h_j = \begin{cases} g_j(x_0, y_0) & (j = 1 \text{ to } 5) \\ g_{j-5}(x_1, y_1) & (j = 6 \text{ to } 10) \\ g_{j-10}(x_2, y_2) & (j = 11 \text{ to } 15) \\ g_{j-15}(x_3, y_3) & (j = 16 \text{ to } 20) \\ g_{j-20}(x_4, y_4) & (j = 21 \text{ to } 25) \end{cases} \quad (3)$$

To identify N types (kinds) of postage stamps using the feature vector, N features vectors, $\{h_j\}$ corresponding to the respective stamp patterns of N type are extracted beforehand and stored as reference (dictionary) feature vectors $\{h_j^l\}$ ($l = 1, \ldots, N$). The distance $d_l$ between the feature vector $\{h_j\}$ obtained by scanning unknown stamp and the dictionary feature vectors $\{h_j^l\}$, is then calculated.

Any of known methods employed in general pattern recognition apparatuses can be employed to calculate the distance $d_l$. If the distance is calculated by using Euclidean distance in the feature vector space, the following expression is calculated:

$$d_l^2 \equiv \sum_{j=1}^{25} (h_j - h_j^l)^2 \quad (4)$$

Similarly, if Mahalanobis' distance is employed, the following expression is calculated:

$$d_l^2 \equiv (\underline{h} - \underline{h}^l)^t S_l^{-1} (\underline{h} - \underline{h}^l) \quad (5)$$

where $\underline{h}$ and $\underline{h}^l$ are the column vectors of $\{h_j\}$ and $\{h_j^l\}$, and $S_l$ is the covariance matrix of $\{h_j\}$ which have been obtained beforehand by scanning various known stamp patterns.

If there is a stamp of the l-type with the image input position (x', y') as the center thereof, the distance $d_l$ becomes a very small value. Therefore, a threshold value $T_l$ is set for each type of stamps, and the following condition is checked to detect the presence of l-type of the stamp centered on the position (x',y'):

$$d_l < T_l \quad (6)$$

In addition, when Mahalanobis' distance is employed, any variation in the feature vector is included in the distance, and a threshold value $T_l$ can therefore be made a constant which does not vary in accordance with the type of stamp.

Although any set of components defining the feature vector $\{h_j\}$ can be selected depending on how color moment is selected, it is effective to normalize the color moment in terms of change in the amount of light of the illumination. Illumination of the scanner varies with time, and the brightness of the illumination supplied when a dictionary feature vector is extracted may be different from that supplied when an unknown postage stamp is scanned. This variation in brightness changes the color moment, reducing the recognition accuracy. Accordingly, in order to prevent such disadvantage the feature vector can be normalized by using the brightnesses of the components, as follows:

$$\begin{cases} g_1(x,y) = M_1(x,y) / \overline{M}_1 \\ g_2(x,y) = M_2(x,y) / \overline{M}_2 \\ g_3(x,y) = M_3(x,y) / \overline{M}_3 \\ g_4(x,y) = M_4'(x,y) / \overline{M}_1^2 \\ g_5(x,y) = M_5'(x,y') / \overline{M}_2 \cdot \overline{M}_3 \end{cases} \quad (7)$$

where $\overline{M}_1$, $\overline{M}_2$ and $\overline{M}_3$ are, respectively, averages of $M_1$, $M_2$ and $M_3$ at their respective center positions, and are expressed by:

$$\begin{cases} \overline{M}_1 = \sum_{p=0}^{4} M_1(x_p, y_p)/5 \\ \overline{M}_2 = \sum_{p=0}^{4} M_2(x_p, y_p)/5 \\ \overline{M}_3 = \sum_{p=0}^{4} M_3(x_0, y_0)/5 \end{cases} \quad (8)$$

The above normalization decreases degree of freedom, and, as a result, the feature vector $\{\overline{h}_j\}(j = 1, \ldots, 20)$ of the entire image can be determined as follows:

$$h_j = \begin{cases} g_j(x_1, y_1) & (j = 1 \text{ to } 5) \\ g_{j-5}(x_2, y_2) & (j = 6 \text{ to } 10) \\ g_{j-10}(x_3, y_3) & (j = 11 \text{ to } 15) \\ g_{j-15}(x_4, y_4) & (j = 16 \text{ to } 20) \end{cases} \quad (9)$$

The distance $d_l$ between the feature vectors $\{h_j\}$ and $\{h_{jl}\}$ is then defined in the same manner as that in Expressions (4) and (5) so as to identify the stamp pattern by Expression (6).

Further, more accurate recognition is possible by utilizing color moments of higher order beyond the first order and the second order described above. On the other hand, if the stamp pattern to be detected is not very complicated, it is possible to identify a stamp pattern by using the color moment of first order, i.e., the weighted averages of primary colors R, G and B. In this case, only linear weighted average of the R, G, and B color signals are employed, and it is not therefore necessary to perform the convolution operation of Expression (1). Furthermore, in this case, equivalent result of the weighted average calculation is easily obtained by setting up a scanner out of focus.

A first embodiment of the present invention will now be described with reference to FIG. 3. A stamp pattern 1 is scanned by a sensor 2 and band channels employed in the embodiment for imaging are R (red), G (green), and B (blue). Three primary color signals R, G, and B which are generated by the sensor 2 are digitzed for picture elements, and are input to an arithmetic circuit 3. The arithmetic circuit 3 calculates the product portion of Expression (1), i.e., $$R(x, y)^{\rho_k} \cdot G(x, y)^{\gamma_k} \cdot B(x, y)^{\beta_k} \quad (10)$$

for each picture element. For example, the arithmetic circuit 3 outputs the following five values:

$R(x, y)$ when $\rho_1 = 1$, $\gamma_1 = \beta_1 = 0$, $G(x, y)$ when $\rho_2 = 0$, $\gamma_2 = 1$, $\beta_2 = 0$, $B(x, y)$ when $\rho_3 = \gamma_3 = 0$, $\beta_3 = 1$, $R(x, y)^2$ when $\rho_4 = 2$, $\gamma_4 = \beta_4 = 0$, and $G(x, y) \cdot B(x, y)$ when $\rho_5 = 0$, $\gamma_5 = \beta_5 = 1$.

Figure 4:
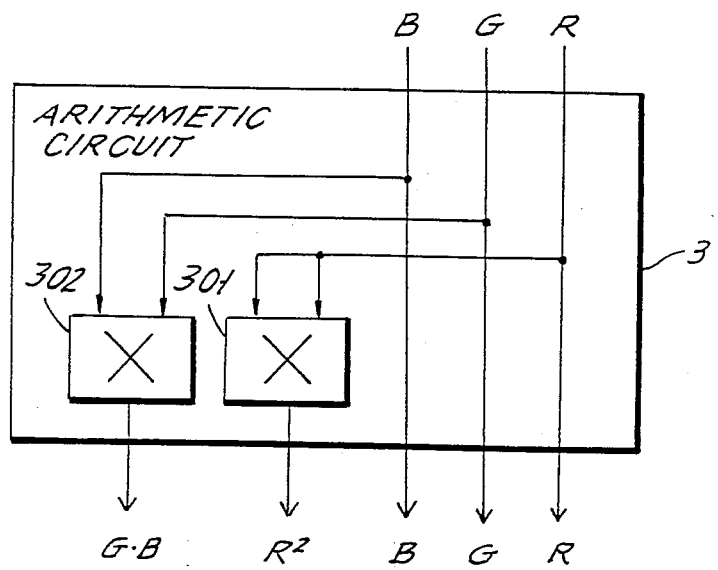
FIG. 4 illustrates an arithmetic circuit associated with the first embodiment shown in FIG. 3.

The arithmetic circuit 3 is constructed as shown in FIG. 4. In arithmetic circuit 3, the R, G, and B signals are simply passed through. However, the $R^2$ and G.B signals are respectively calculated by multiplier 301 and multiplier 302 before being output from arithmetic circuit 3. The signals from arithmetic circuit 3 are supplies to respective convolution circuits 4. Each convolution circuit 4 multiplies the corresponding signal by the weights $\omega$ shown in FIG. 5, and adds up these products.

Figure 5:
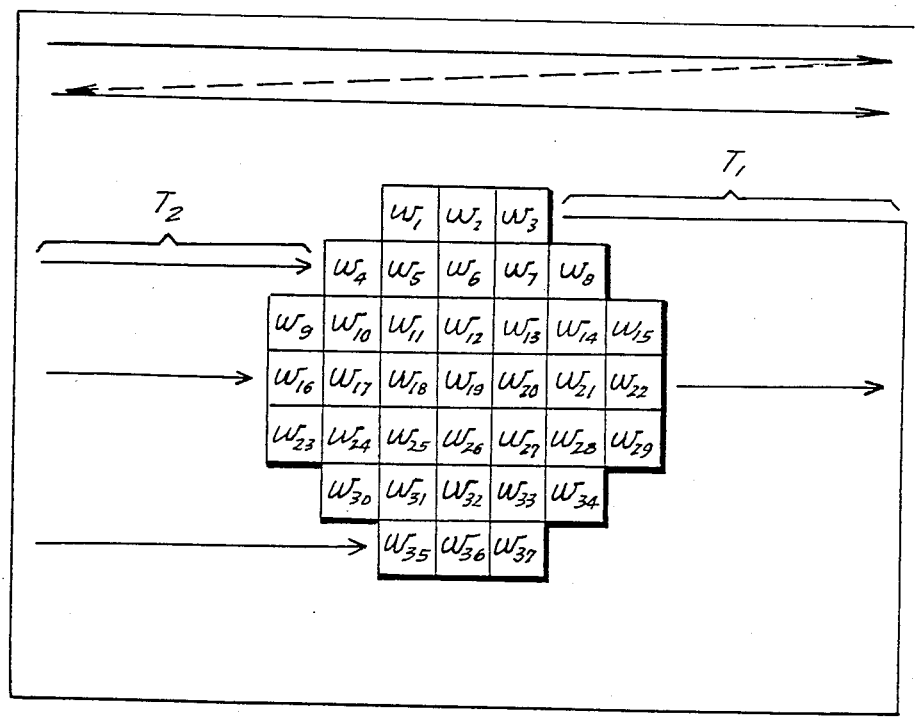
FIG. 5 illustrates distribution of weights employed in a convolution circuit in the first embodiment shown in FIG. 3.
Figure 6:
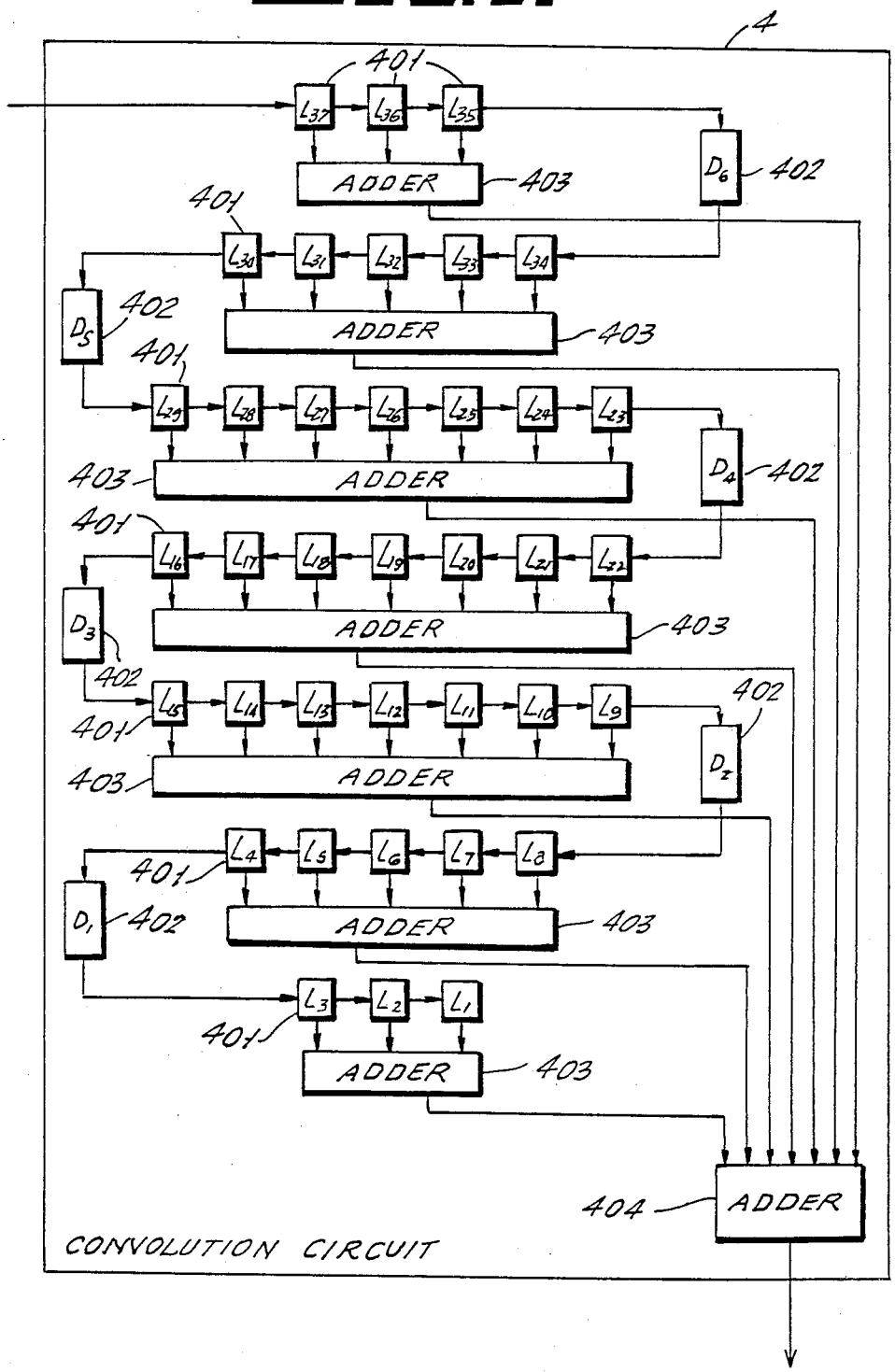
FIG. 6 illustrates the convolution circuit in the first embodiment shown in FIG. 3.
Figure 7:
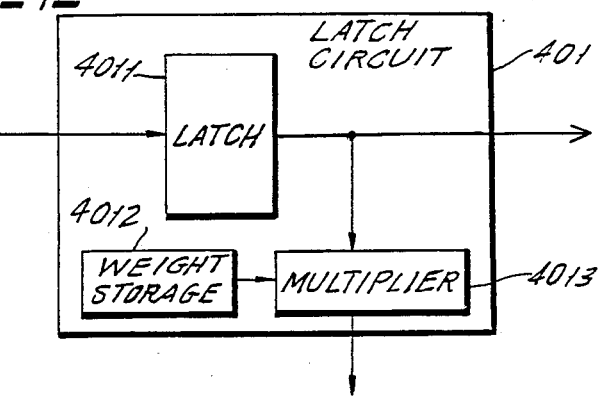
FIG. 7 illustrates a latch circuit in the convolution circuit shown in FIG. 6.

The arrangement of each convolution circuit 4 will now be described in detail by referring to FIGS. 5 to 7. In the illustrated embodiment, thirty-seven signal values of thirty-seven picture elements in the image portion are weighted by $W_1, W_2, \ldots, W_{37}$ as shown in FIG. 5 and added to obtain a value for a signal value of the picture element at the center of the image portion. Each convolution circuit 4 is constructed as shown in FIG. 6. Convolution circuit 4 includes latch circuits 401, labeled $L_1$ to $L_{37}$. Each latch circuit retains the signal value of one picture element in synchronism with the scanning of the stamp pattern. Further, each latch circuit 401 is constructed as shown FIG. 7. In FIG. 7, each picture element signal value is retained in a latch 4011, and is output to the subsequent latch circuit. A multiplier 4013 multiplies the picture element signal value by the corresponding weight ($W_1, W_2, \ldots, W_{37}$) stored in a weight storage 4012.

When the entire stamp pattern is scanned sequentially in the manner shown by an arrow in FIG. 5, the output signal is sequentially supplied to the latch circuits $L_{37}$ to $L_1$ as the scanning proceeds. When the first picture element signal value has been retained in the latch circuit $L_1$, the latch circuits $L_1$ to $L_{37}$ have retained respective picture element signal values. Then, these picture element signal values are multiplied with the respective weights shown in FIG. 5 and the multiplied results of each line are supplied to respective adders 403. The added results of respective lines are supplied to an adder 404. Delay circuits 402 are provided to adjust the timing of picture elements signals over two lines. For example, the delay circuit $D_1$ in FIG. 6 delays signals for a time $T_1 + T_2$ relating to FIG. 6 during which the scanning shifts from the position $W_3$ to the position $W_4$. Consequently, the adder 404 adds up all the weighted picture element signal values and outputs the result of the previously defined Expression (1).

Figure 8:
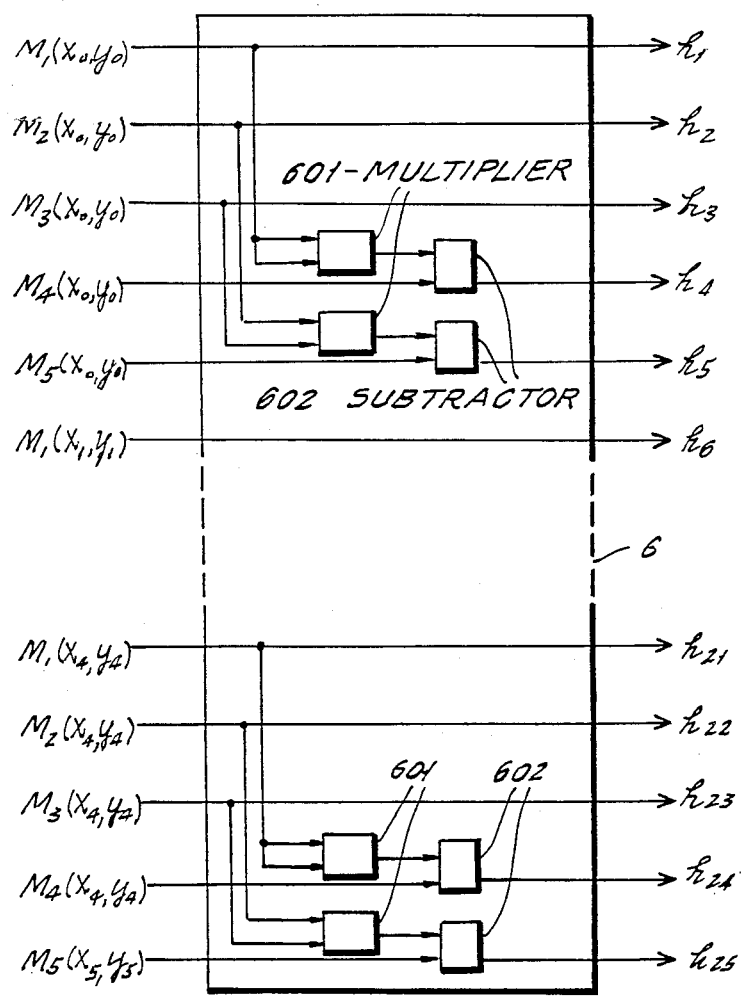
FIG. 8 illustrates a featuring circuit in the first embodiment shown in FIG. 3.

Referring back to FIG. 3, color moments $M_1$ to $M_5$ from the convolution circuits 4 correspond to the color distribution of one image portion (for example, the one centered on $(x_0, y_0)$) shown in FIG. 1. In order to identify the stamp pattern by the feature vector $\{h_j\}$ shown in Expression (3) which is produced from the five image portions shown in FIG. 1, the color moments $M_1$ to $M_5$ must each be delayed by a time which corresponds to the distance among the image portions. These operations are carried out by delay circuits 5. Consequently, color moments $M_1$ to $M_5$ obtained for each image portion are supplied to a featuring circuit 6. In the present embodiment, if these color moments are employed as they are as the feature vector, the featuring circuit 6 can be eliminated. However, the color moments $M_4$ and $M_5$ are transformed into the other color moments $M_4'$ and $M_5'$ which are uncorrelated with the color moments $M_1$ to $M_3$, as described previously, and the featuring circuit 6 calculates Expression (2) to obtain the feature vector $\{h_j\}$. As shown in FIG. 8, the featuring circuit 6 includes multipliers 601 and subtractors 602, and each pair of one multiplier and one subtractor perform the calculations of Expressions (2) for each image portion.

Figure 9:
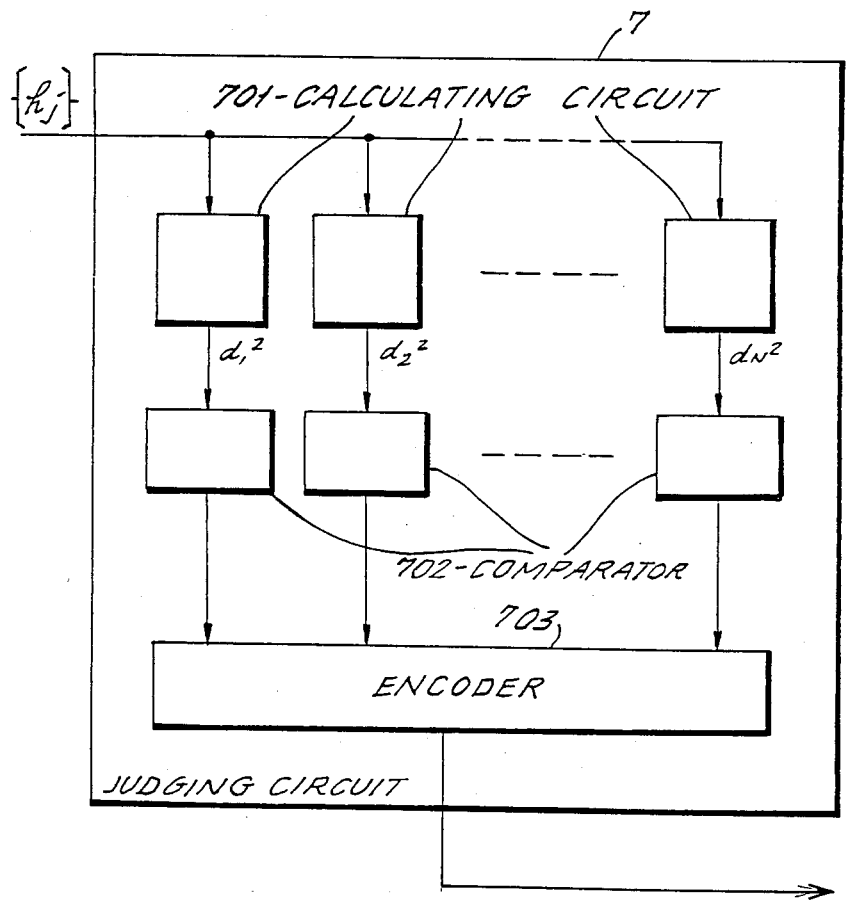
FIG. 9 illustrates a judging circuit in the first embodiment shown in FIG. 3.

A judging circuit 7 determines a distance between the feature vector $\{h_j\}$ obtained from a scanned stamp pattern and the dictionary feature vectors $\{h_j^l\}$ ($l = 1, 2, \ldots, N$) of known previously stored stamp patterns, and thereby identifies the stamp and outputs a recognition signal. The judging circuit 7 is constructed as shown in FIG. 9. In this Figure, the feature vector $\{h_j\}$ is supplied to distance calculation circuits 701, and these circuits 701 calculate squares of the distance $d_l^2$ with respect to respective dictionary feature vectors, i.e., known stamp pattern by Expression (4) or (5). Comparing circuits 702 compare the respective thus-obtained distances with corresponding threshold values. The comparing circuits 702 delivers output signals when Expression (6) is satisfied. The encoder 703 detects which comparing circuit 702 has delivered the output signal, and delivers the recognition signal representative of an identified stamp.

FIG. 10 illustrates an example of a distance calculating circuit 701 in which a Mahalanobis' distance is calculated. In FIG. 10, a dictionary storage 7011 stores the dictionary feature vector $\{h_j^l\}$ of l-type stamp, and a matrix storage 7012 stores the inverse matrix $S_l^{-1}$ of the covariance matrix for the dictionary feature vector. As described above, the stored dictionary feature vector $\{h_j^l\}$ and the inverse matrix $S_l^{-1}$ are previously obtained by scanning the known stamp of the l-type. Subtraction circuit 7013 delivers the difference between the feature vector $\{h_j\}$ and the dictionary feature vector $\{h_j^l\}$ on element-to-element basis. An inner product calculation circuit 7014 calculates the inner products of the subtraction results the matrixes stored in the matrix storage circuits 7012. To simplify the explanation, FIG. 10 shows a matrix storage means of five matrixes. However, in the given example, $S_l^{-1}$ is a 25×25 matrix, and calculations of the inner products of 25 matrixes are required in practice. Consequently, vectors having the components of the number of matrixes are obtained, and an inner product calculation circuit 7015 obtains the inner products of these vectors and the outputs of the subtraction circuits 7013 so as to obtain $d_l^2$.

A second embodiment of the present invention is described below. In the second embodiment, the feature vector $\{h_j\}$ is normalized by Expression (7) and the normalized feature vector is applied to the distance calculation. The arrangement of this embodiment is the same as that of the first embodiment of FIG. 3 except for the featuring circuit 6. FIG. 11 shows the construction of the featuring circuit 6 employed in the second embodiment. Similarly to the first embodiment, multiplier 601 and subtractor 602 obtain color moments $M_1$ to $M_3$ and $M_4'$ and $M_5'$ for each image portion in FIG. 1 from the input color moment $M_1$ to $M_5$. Averaging circuits 603 calculate the averages $\overline{M}_1$ to $\overline{M}_3$ of $M_1$ to $M_3$ of all the image portions on the bases of Expression (8). These averages are used for normalization. First order normalization circuits 604 determine $g_1$ to $g_3$ for each image portion by dividing $M_1$ to $M_3$ by $\overline{M}_1$ to $\overline{M}_3$, as shown by Expression (7). Second order normalization circuits 605 determine $g_4$ and $g_5$ by dividing $M_4'$ by $\overline{M}_1$ twice, and by dividing $M_5'$ by $\overline{M}_2$ and $\overline{M}_3$, respectively.

In the second embodiment, since the degree of freedom of the feature vector is decreased by the normalization, the feature vector corresponding to the position $(x_0, y_0)$ is eliminated, and the feature vector $\{h_j\}$ containing elements $g_1$ to $g_{20}$, which are shown in Expression 9, is obtained. The construction of other parts of this embodiment is therefore the same as that of the first embodiment shown in FIG. 3. However, it is to be noted that in the case of using the Mahalanobis' distance, the distance calculation circuit 701 is constructed such that the size of the matrix storage 7012 corresponds to the number of elements in the feature vector.

A third embodiment of the present invention will be described by reference to FIG. 13. In this embodiment, color moments of higher-order are not required. The present embodiment may be realized by eliminating the convolution of $R^2$ and $G \cdot B$ components in the first embodiment. However, in the third embodiment, instead of performing the complicated calculations of the convolution for R, G, and B primary color signals, the same function is performed by modifying a optical scanning part. Namely, a stamp pattern is optically defocused relative to the sensor, i.e., a scanner is disposed out of focus, so that weighting operation shown in FIG. 12 can be easily performed.

The operation of the third embodiment is as follows. In FIG. 13, when a sensor 2 scans a stamp pattern 1, the sensor outputs R, G, and B color signals as image data. At this time, since the stamp pattern relative to the sensor 2 is out of focus, color moments $M_1$, $M_2$ and $M_3$ for each image portion can therefore be obtained without calculations of convolution. The delay circuits 5 delay the $M_1$ to $M_3$ to obtain color moments for all the image portions which are in a fixed positional relationship to one another, and the feature vector $\{h_j\}$ is produced. The feature vector $\{h_j\}$ in then supplied to the judging circuit 7 to identify the stamp pattern.

A fourth embodiment of the present invention is described below, in which the feature obtained in the third embodiment is normalized before being supplied to the judging circuit. FIG. 14 shows a structure of the fourth embodiment. A featuring circuit 6 is added to the structure shown in FIG. 13 to carry out the normalization. The featuring circuit 6 calculates $g_1$ to $g_3$ indicated by Expression (7) for each image portion. Therefore, the featuring circuit 6 of the fourth embodiment is realized by eliminating circuit elements for processing the color moments $M_4$ and $M_5$ in the featuring circuit 6 shown in FIG. 11 (including the multipliers 601 and subtractors 602).

Figure 15:
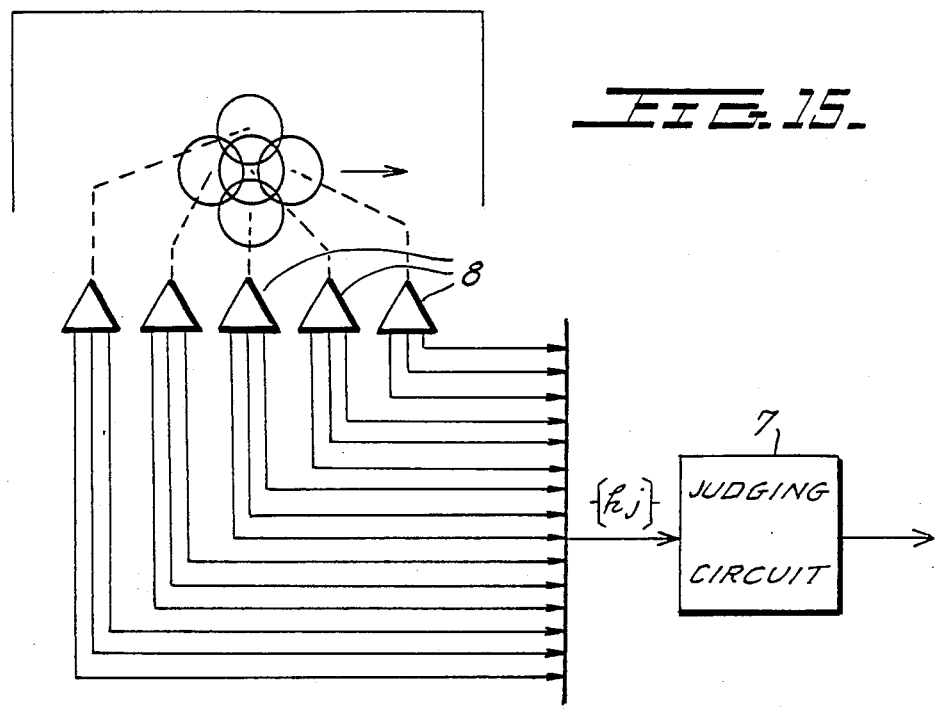
FIG. 15 illustrates a diagram of a fifth embodiment of the present invention.

A fifth embodiment of the present invention is described referring to FIG. 15. In the third embodiment of FIG. 13, the sensor 2 senses only one portion at a time, and simultaneous observation of a plurality of the image portions is virtually realized with the aid of the delay circuits 5. In the fifth embodiment, this can be realized by actually using a plurality of color sensors, as illustrated in FIG. 15. In the figure, respective sensors 8 sense the corresponding image portions. Five sets of primary color signals delivered from the respective defocused sensors 8 are supplied to a judging circuit 7 as the feature vector $\{h_j\}$. The judging circuit 7 is constructed as shown in FIG. 9.

Figure 16:
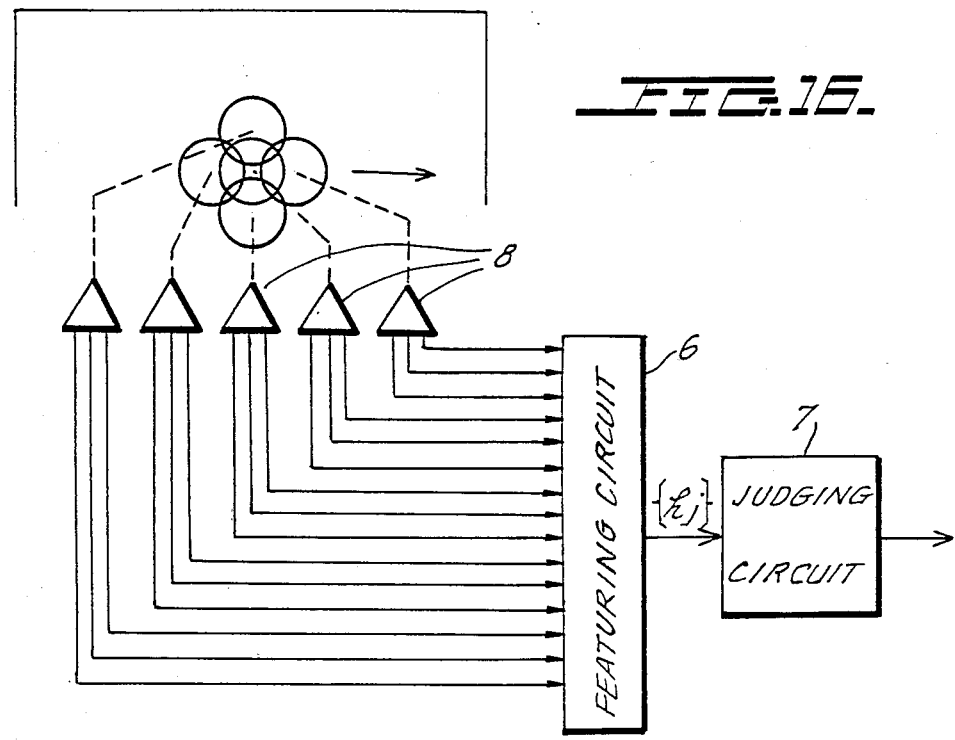
FIG. 16 illustrates a diagram of a sixth embodiment of the present invention.

A sixth embodiment of the present invention shown in FIG. 16 is described below. The operation of this embodiment is exactly the same as that of the fifth embodiment except that normalization is applied. A featuring circuit 6 is therefore added to the structure shown in FIG. 15. The feature vector $\{h_j\}$ is obtained through the featuring circuit 6 in the same manner as in the fourth embodiment, and the feature vector $\{h_j\}$ is processed in the same manner.

Figure 17:
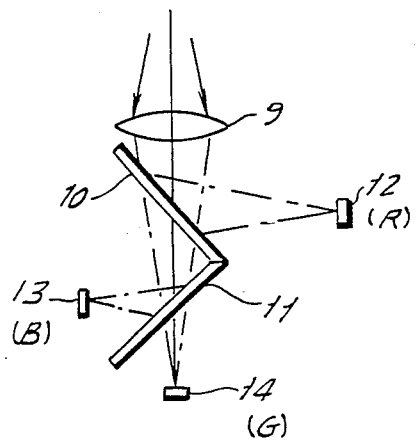
FIG. 17 illustrates a diagram for extracting red (R), green (G) and blue (B) components from an output of a scanning means.

FIG. 17 shows a structure for extracting R, G, and B color signals from one scanning output. In FIG. 17, light from the scanned surface is supplied through a lens 9 to splitters 10 and 11, each for separating light having a predetermined wavelength. Light of R component, B component, and G component separated by the splitters 10 and 11 are respectively supplied to photoelectric elements 12, 13 and 14 so as to deliver R, B and G color signals.

Figure 13:
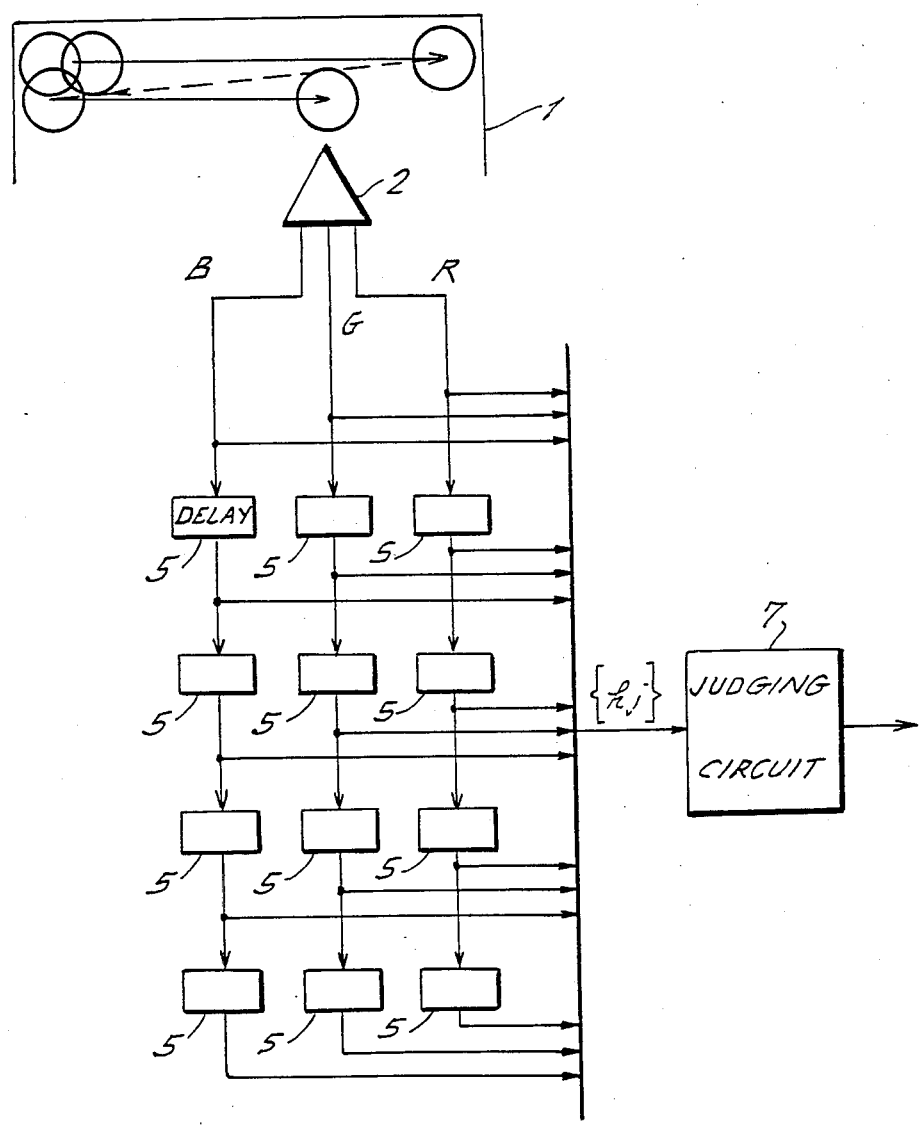
FIG. 13 illustrates a block diagram of a third embodiment of this invention.
Figure 14:
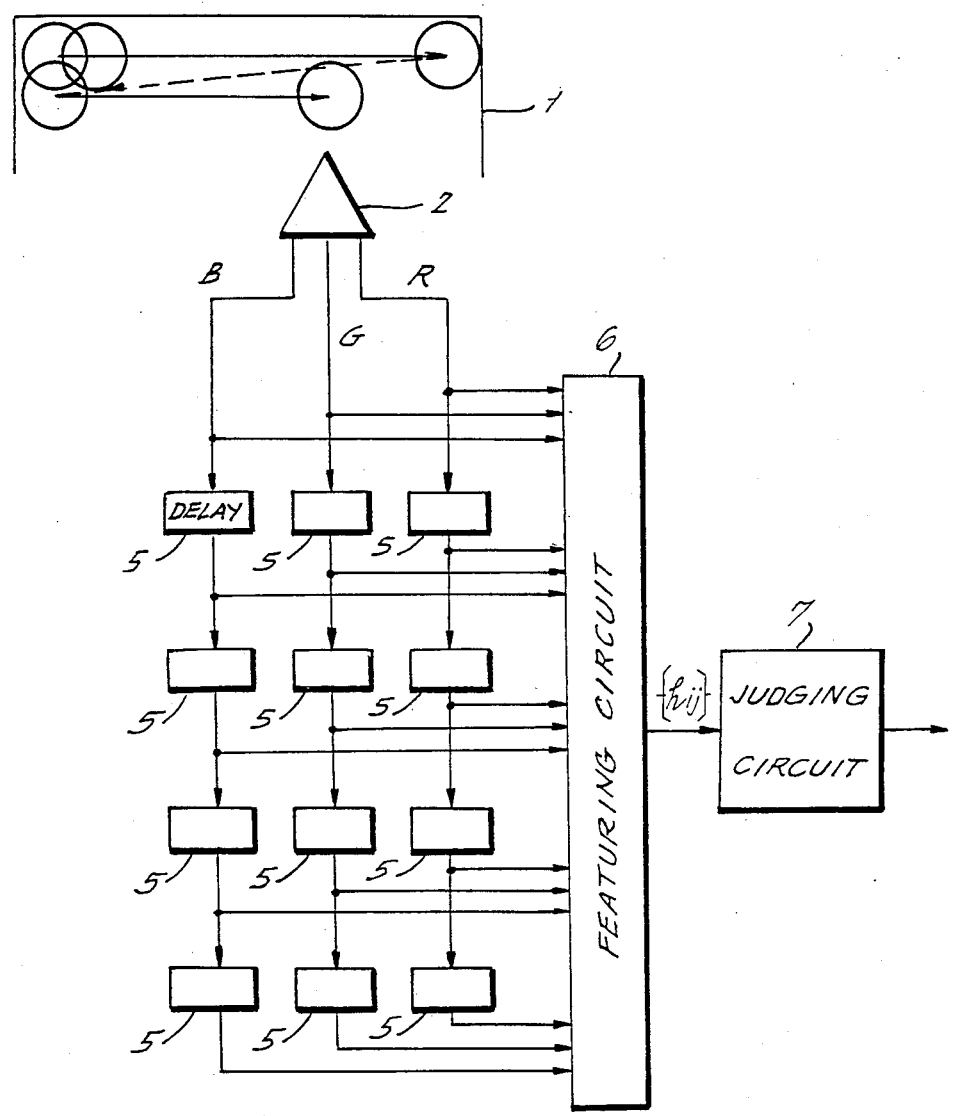
FIG. 14 illustrates a block diagram of a fourth embodiment of the present invention.

In the embodiments shown in FIGS. 3, 13, and 14, scanning operation consists of horizontal scanning and vertical scanning. A mechanical scanning mirror or a line sensor is employed for horizontal scanning, while a mechanism for shifting a surface to be scanned is employed for vertical scanning.

Figure 18:
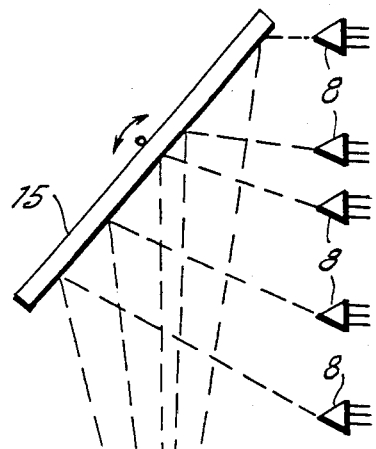
FIG. 18 illustrates a diagram of a scanner which extracts respective color distribution signals at different positions on a stamp.

In the embodiments shown in FIGS. 15 and 16, five sensors simultaneously sense corresponding image portions on the stamp during a scanning. In these cases, conventional scanning mechanisms can be employed to carry out such scanning, and FIG. 18 shows one example thereof. Light from a scanned surface 2 is supplied through a lens 9 and a mirror 15 to five sensors 16. The mirror 15 is turned about the center thereof to horizontally scan the surface, and the scanned surface is shifted in the vertical direction.

FIG. 19 shows a seventh embodiment in which scanning is performed by a line sensor. In this embodiment, three sensor arrays are employed to carry out the horizontal scanning electronically. The surface to be scanned as mechanically moved for vertical scanning. The sensor arrays 17, 18 and 19 are the line sensor arrays which produce red, green and blue color signals, respectively. To this end, the sensor arrays receive red, green, and blue light components from a scanning line L, respectively. The output signals of the sensor arrays are digitized by corresponding A/D converters 20. Generally, a line sensor includes a large number of sensing elements, for example, 256 sensing elements. In this embodiment, delay circuits 21 to 24 are also employed to virtually sense five image portions.

Figure 20:
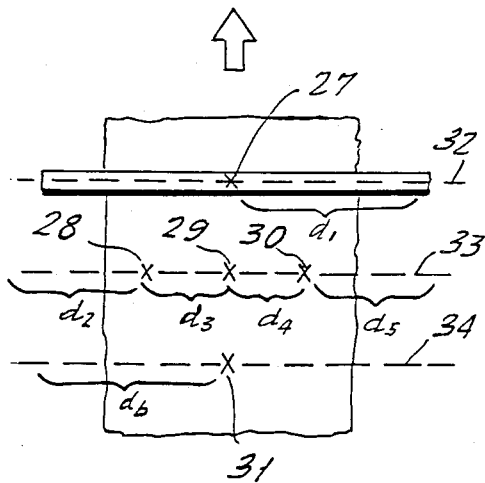
FIG. 20 illustrates a diagram for explaining the operation of the seventh embodiment shown in FIG. 19.

The operation of these delay circuits is described by referring to FIG. 20. The x-marks 27 to 31 in this figure indicate the center positions of five image portions. Assuming that the stamp pattern is scanned in the direction shown by the arrow, the position 27 is sensed when the sensor array is located relatively at a location 32. If outputs of the sensing elements in the sensor array are transferred from the left side to the right side, width $d_1$ in the sensor array is scanned while the sensor array is located at the location 32. The surface to be scanned is then shifted while the sensor array continues to be scanned horizontally. This moves the sensor array relatively from the location 32 to the location 33. Width $d_2$ of the sensor array is then scanned to sense the position 28. The delay circuit 21 delays the outputs of the sensor array by a time which corresponds to this duration. Similarly, the delay circuit 22 delays the outputs by a time during which width $d_3$ from the position 28 to the position 29 is scanned, and the delay circuit 23 delays the outputs by a time during which width $d_4$ from the position 29 to the position 30 is scanned. Further, the delay circuit 24 delays the outputs by a time during which width $d_5$ is scanned and the sensor array is vertically scanned from the relative location 33 to the relative location 34. In this period, width $d_6$ is scanned. These delay circuits 21 to 24 ensure the similar effect performed by the previous embodiments.

Distance calculation circuits 25 and comparing circuits 26 operate in the same way as shown in FIG. 9. A control circuit 27 receives the detection signal from the comparison portions 26, and outputs recognition signal. The control circuit 27 also produces horizontal control signals for the sensor arrays 17 to 19 and a vertical control signal for vertically driving the surface.

Figure 21:
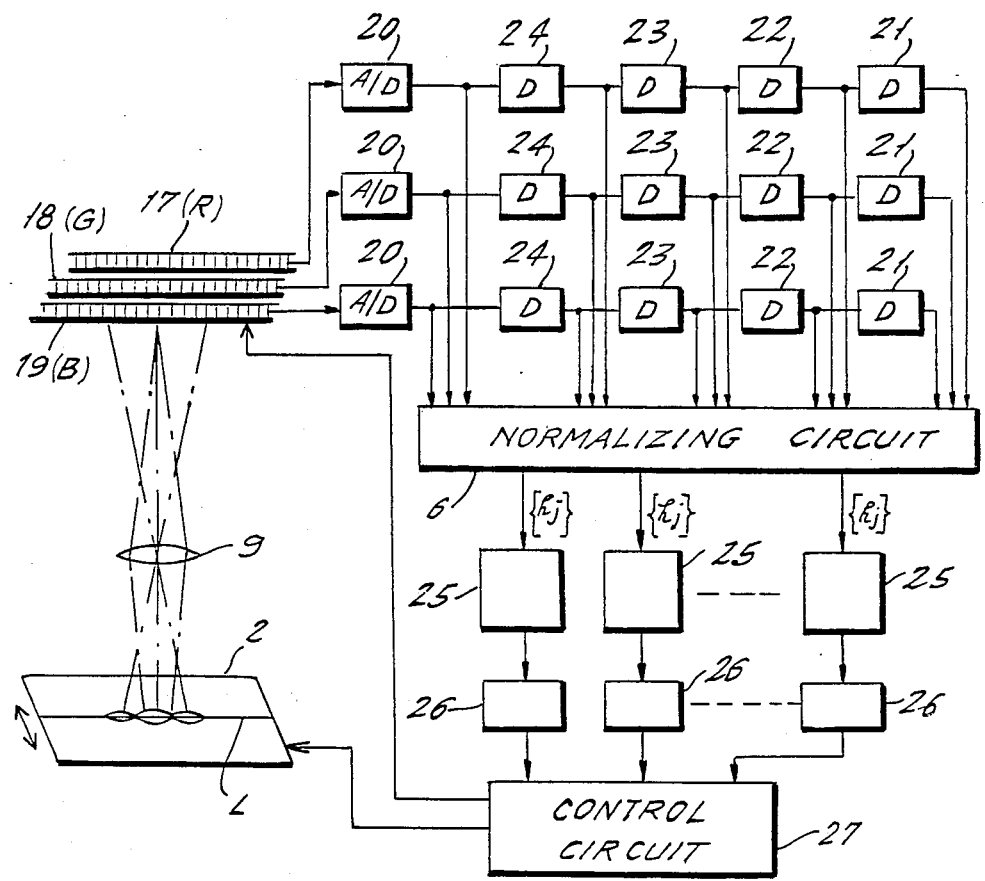
FIG. 21 illustrates a diagram of an eighth embodiment of the present invention.

FIG. 21 shows an eighth embodiment in which a normalization circuit 6 in further added. In the embodiments shown in FIGS. 19 and 21, if an plane sensor array is employed instead of the line sensor array, both horizontal and vertical scanning can be performed electrically.

What is claimed is:

1. An apparatus for identifying postage stamps, comprising:
    scanning means for scanning a postage stamp to deliver color component signals having a level representative of intensity of respective color components;
    means for calculating color distribution signals for respective color components by respectively convoluting said color component signals with weights determined in correspondence with a predetermined two-dimensional region;
    a plurality of delay means for sequentially delaying said color distribution signals to produce a plurality of delayed color distribution signals, said plurality of delayed color distribution signals corresponding to color distribution signals of predetermined two-dimensional regions located at different positions at a generally central portion of the scanned postage stamp;
    feature pattern extracting means for extracting a feature pattern corresponding to a color design of said scanned postage stamp, said feature pattern being a feature vector defined by at least three color distribution signals including said color distribution signals delivered from said calculating means and said plurality of delayed color distribution signals delivered from said plurality of delay means; and
    identifying means for comparing said feature vector produced by said feature pattern extracting means with a prestored dictionary feature vector for each of a plurality of known stamps so as to identify said scanned postage stamp.

2. An apparatus for identifying postage stamps according to claim 1, wherein said feature pattern extracting means further includes normalization means for normalizing said feature vector in accordance with an average of said color distribution signals delivered from said calculating means and said delayed color distribution signals delivered from said delay means.

3. An apparatus for identifying a postage stamp, comprising:
    scanning means for providing a defocused image of a surface of a postage stamp and for scanning said defocused image to produce a scanned signal, the surface having a predetermined two-dimensional size;
    separating means for separating said scanned signal from said scanning means into a plurality of color component signals, said plurality of color component signals each having a level representative of the intensity of each color component associated with said scanned signal;
    delay means for sequentially delaying said plurality of color component signals from said separating means to obtain at least three groups of said plurality of color component signals, said at least three groups being associated with at least three different positions at a generally central portion of said postage stamp;
    featuring means for producing a feature vector corresponding to a color design of said postage stamp, said feature vector being defined by said at least three groups of said plurality of color component signals obtained by said delay means; and
    comparing means for comparing said feature vector from said featuring means with a prestored reference feature vector associated with each of a plurality of known stamps so as to identify the scanned postage stamp.

4. An apparatus according to claim 3, further including normalizing means for normalizing said feature vector in accordance with the average of said at least three groups of said plurality of color component signals from said delay means.

5. An apparatus for identifying a postage stamp, comprising:

a plurality of scanners for simultaneously and two-dimensionally scanning said postage stamp at at least three different positions at a generally central portion of said postage stamp;

a plurality of separating means for respectively separating the outputs of said plurality of scanners into a plurality of color component signals;

featuring means for producing a feature vector representative of a color design of the postage stamp, said feature vector being defined by a set of said plurality of color component signals delivered from said plurality of separating means; and comparing means for comparing said feature vector from said featuring means with prestored reference feature vectors associated with a plurality of known stamps so as to identify the scanned postage stamp.

6. An apparatus according to claim 5, wherein said featuring means includes normalizing means for normalizing the levels of said plurality of color component signals delivered from said plurality of separating means in accordance with the average levels of said plurality of color component signals delivered from said plurality of separating means.

7. An apparatus for identifying postage stamps, comprising:

a plurality of color sensors for scanning a surface of a postage stamp at at least three different positions of a generally central portion of the postage stamp to produce at least three scanned signals representative of convolution values of color distributions, a set of said at least three scanned signals defining a pattern feature representative of a color design of said postage stamp;

distance calculating means for calculating a distance between said pattern feature of said postage stamp and a reference pattern feature of a known stamp; and comparing means for comparing said distance obtained by said distance calculating means with predetermined threshold value and for outputting a detection signal indicating that said postage stamp corresponds to said known stamp when said distance is less than said threshold value.

8. An apparatus for identifying postage stamps, comprising:

a plurality of color sensors for scanning a surface of a postage stamp at at least three different positions of a generally central portion of said postage stamp to produce a plurality of scanned signals representative of convolution values of color distributions;

normalizing means for normalizing said plurality of scanned signals delivered from said plurality of color sensors in accordance with an average value of said plurality of scanned signals at said at least three different positions so as to obtain a feature vector of said postage stamp, said feature vector representative of a color design and defined by a plurality of normalized signals delivered from said normalizing means;

distance calculating means for calculating a distance between said feature vector of said postage stamp and a reference feature vector of a known stamp, said reference feature vector being previously prepared for said known stamp; and comparing means for comparing said distance obtained by said distance calculating means with a predetermined threshold value and for outputting a detection signal when said distance is less than said threshold value.

9. An apparatus for identifying postage stamps, comprising:

a color sensor array for scanning a surface of a postage stamp, said sensor array having a plurality of photoelectric elements, each of said photoelectric elements delivering a convolution value of color distribution at a portion of said postage stamp;

delay means for sequentially delaying the output of said color sensor array to produce a set of at least three delayed signals, said at least three delayed signals being associated with and corresponding to at least three different positions of a generally central portion on the postage stamp and defining a pattern feature for the postage stamp;

distance calculating means for calculating a distance between said pattern feature defined by said set and a prestored reference set of signals corresponding to a known reference stamp; and comparing means for comparing said distance obtained by said distance calculating means with a predetermined threshold value and for outputting a detection signal when said distance is less than said threshold value.

10. An apparatus for identifying postage stamps, comprising:

a color sensor array for scanning a surface of a postage stamp, said sensor array having a plurality of photoelectric elements to deliver a convolution value of the color distribution at a portion of the postage stamp;

delay arrangement means for delaying the output of said color sensor array to produce at least three delayed signals, said at least three delayed signals corresponding to signals delivered by sensing at least three respective positions of a generally central portion of the postage stamp;

normalizing means for normalizing said at least three delayed signals delivered from said delay arrangement means in accordance with the average of said at least three delayed signals associated with said at least three respective positions to obtain a plurality of normalized signals, a set of said plurality of normalized signal defining a feature vector of said stamp;

distance calculating means for calculating a distance between said feature vector of said stamp with a reference feature vector of a known stamp; and comparing means for comparing said distance obtained by said distance calculating means with predetermined threshold value and for outputting a detection signal when said distance is less than said threshold value.

11. An apparatus for identifying postage stamps according to claim 1, wherein said color component signals are a red signal, a green signal, a blue signal, a squared signal of said red signal, and a multipled signal between said green signal and said blue signal.

12. An apparatus for identifying postage stamps according to claim 1, wherein said predetermined two-dimensional regions of said different positions on said scanned stamp are disposed on said scanned stamp in an overlapped manner.

13. A method for identifying postage stamps automatically, comprising the steps of:

scanning a stamp to detect various colors present at at least three different positions of a generally central portion of the stamp and producing color signals representative of the colors;

deriving from the color signals a feature vector indicative of a color design pattern of said stamp which represents the color distribution over the said at least three different positions on the stamp;

storing in a memory a plurality of reference feature vectors wherein each reference feature vector represents the color distribution of a given, known stamp; and comparing the derived feature vector to the stored feature vectors and, on that basis, identifying the stamp being scanned.

14. A method for identifying stamps as in claim 13, in which the feature vector is obtained by calculating a color moment in each image portion, the color moment being calculated by reference to the red, blue and green color content at the image portion and weighted in accordance with a predetermined convolution function, and further including producing the feature vector for a given stamp by combining the color moment in each of the image portions.

15. A method for identifying stamps as in claim 13, in which the step of comparing the derived feature vector to the stored feature vectors is carried out by calculating the euclidean distance between the derived feature vector and of the stored feature vectors to find a correspondence between the derived feature vector and one of the stored feature vectors.

16. A method for identifying stamps as in claim 13, in which the step of comparing the derived feature vector to the stored feature vectors is carried out by calculating the Mahalanobis distance between the derived feature vector and of the stored feature vectors to find a correspondence between the derived feature vector and one of the stored feature vectors.

17. A method as in claim 16, further comprising the step of normalizing the feature vector in accordance with an average of the color signals associated with the different portions and storing normalized feature vectors for said known stamps and comparing the normalized feature vector to the stored normalized feature vectors.

18. A method as in claim 13, in which said color signals include signals representing red, green and blue color components of said stamp and, in addition, a signal representative of the square of the red color component of the stamp and another signal representative of the product of the green and blue color components in said stamp.

* * * * *